(12) United States Patent
Greene

(10) Patent No.: US 7,886,416 B1
(45) Date of Patent: Feb. 15, 2011

(54) REPLACEMENT ACCUMULATOR PLATE AND METHOD OF USE

(75) Inventor: Brandon W. Greene, Springfield, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 1071 days.

(21) Appl. No.: 11/599,683

(22) Filed: Nov. 14, 2006

Related U.S. Application Data

(60) Provisional application No. 60/755,404, filed on Jan. 3, 2006.

(51) Int. Cl.
*B23P 19/00* (2006.01)

(52) U.S. Cl. ............... 29/401.1; 29/402.08; 29/558; 192/3.58; 192/109 B; 192/109 F; 475/123

(58) Field of Classification Search ............... 29/401.1, 29/527.5, 527.6, 557, 558, 819, 402.08; 192/3.29, 192/145, 219, 3.58, 85.63, 109 F; 475/138–148, 475/116–122, 129
See application file for complete search history.

(56) References Cited

PUBLICATIONS http://web.archive.org/web/20051115053613/www.transmissionspecialty.com/featured/featured_08.htm.*
Distributor Data Sheet (one page) from http://www.sonnax.com/announcements/44892-01K; May 29, 2005.*
Wayback Machine search results printout for http://web.archive.org/web/*/http://sonnax.com (2 pages).*
Sonnax Industries Transmission page from http://web.archive.org/web/20050723022911/http://www.sonnax.com.*
http://www.omegamachine.com/html/45RFE_valve_body_accumulator_plate.html, Aug. 2004.*
http://www.omegamachine.com/pdf/nproducts/45RFE_accumulator_plate.pdf, Aug. 2004.*
http://web.archive.org/web/20050611074653/http://www.transmissioncenter.net/Shift_Kits.htm; Jun. 2005.*
http://web.archive.org/web/20051115073615/http://www.transmissioncenter.net/Shift_Kits.htm. Performance Automotive and Transmission Center.

* cited by examiner

*Primary Examiner*—David P Bryant
*Assistant Examiner*—Bayan Salone
(74) *Attorney, Agent, or Firm*—Downs Rachlin Martin PLLC; Clifford F. Rey

(57) ABSTRACT

A replacement accumulator plate for use in CHRYSLER 45RFE and CHRYSLER 5-45RFE transmission valve bodies is redesigned to increase the service longevity of the original equipment manufacture accumulator assemblies disposed in the valve body including the low/reverse clutch accumulator, the $2^{nd}$ clutch accumulator, the $4^{th}$ clutch accumulator, the underdrive clutch accumulator, and the overdrive clutch accumulator. The present replacement accumulator plate includes a plurality of stress reduction zones, which are integrated into the replacement accumulator plate to reduce flexion imparted to the plate in operation. A method of the present invention provides for the formation of such stress reduction zones on the replacement accumulator plate and for the installation of additional fasteners which extend through the replacement accumulator plate to engage mating threaded holes formed in the valve body adjacent to the accumulator assemblies to minimize the mechanical stress and breakage commonly found in the original equipment manufacture accumulator plate.

8 Claims, 5 Drawing Sheets

REPLACEMENT ACCUMULATOR PLATE AND METHOD OF USE

CROSS-REFERENCE TO RELATED APPLICATION

This application claims the benefit under 35 U.S.C. 119(e) of U.S. Provisional Patent Application No. 60/755,404 filed Jan. 3, 2006, entitled Accumulator Plate.

BACKGROUND OF THE INVENTION

The present invention relates generally to the field of automatic transmission systems and, more particularly, to a replacement accumulator plate for use in CHRYSLER 45RFE and CHRYSLER 5-45RFE transmissions (hereinafter "CHRYSLER transmissions").

Automatic transmission systems of the prior art have a hydraulic circuit sub-system which includes at least a hydraulic pump, a valve body having fluid conducting passages or circuits, input and exhaust ports formed within the fluid circuits, and a plurality of valves comprised of generally cylindrical pistons having control diameters or lands formed thereon, which alternately open and close the ports to fluid circuits to regulate the flow and pressure of automatic transmission fluid (hereinafter "ATF").

Once released into a specific fluid circuit, the pressurized ATF functions to actuate hydraulic clutches, servo pistons, and other components of the transmission. It will be understood that in describing hydraulic circuits, ATF usually changes names when it passes through an orifice or control valve in a specific fluid circuit.

In CHRYSLER transmissions so-called accumulators are used to control shift feel during the application of hydraulic clutches. An accumulator is a spring-loaded device that absorbs a certain amount of apply fluid pressure to cushion the application of a clutch or band against fluid shock. The apply fluid pressure is directed to an accumulator piston that opposes a spring force in the manner of a shock absorber.

In the original equipment manufacture (hereinafter "OEM") of the CHRYSLER transmissions, an array of accumulator pistons typically reciprocates against spring pressure within the valve body of the transmission. Coil springs are installed in coaxial alignment with each of such accumulator pistons and are secured in position by an accumulator plate whereon the springs are seated. A problem exists with the OEM accumulator plate, which is mechanically attached by fasteners to the valve body in a manner that permits the plate to flex, mechanically fatigue, and eventually break under the hydraulic pressure generated by the accumulators in operation. This process causes malfunction of the accumulators resulting in poor shift quality and damaged clutches and bands.

Thus, the present invention provides a replacement accumulator plate and a method of installation, which resolves this problem and other shortcomings of the prior art.

SUMMARY OF THE INVENTION

The present invention is a replacement accumulator plate for the CHRYSLER transmissions, which has been redesigned to provide increased strength and durability. The present accumulator plate provides added structural reinforcement and cross-sectional thickness to directly support the OEM accumulator assemblies thereby preventing mechanical fatigue of the plate and malfunction of the accumulators.

In a related method of use the present invention provides for the installation of additional fasteners which extend through the accumulator plate and engage mating threaded holes in the valve body adjacent to the accumulator springs to minimize flexion and mechanical stress of the plate in operation.

The present accumulator plate is a direct replacement for the OEM version and provides increased service longevity to the low/reverse clutch accumulator, the $2^{nd}$ clutch accumulator, the $4^{th}$ clutch accumulator, the underdrive clutch accumulator, and the overdrive clutch accumulator in the CHRYSLER transmissions.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Prior to describing the present invention in detail it may be beneficial to briefly review the structure and function of an accumulator assembly of the CHRYSLER transmissions. It will be understood that a plurality of such accumulator assemblies are typically utilized within a particular transmission and are integrated into the transmission valve body or mechanically attached to the valve body as hereinafter described.

Figure 1:
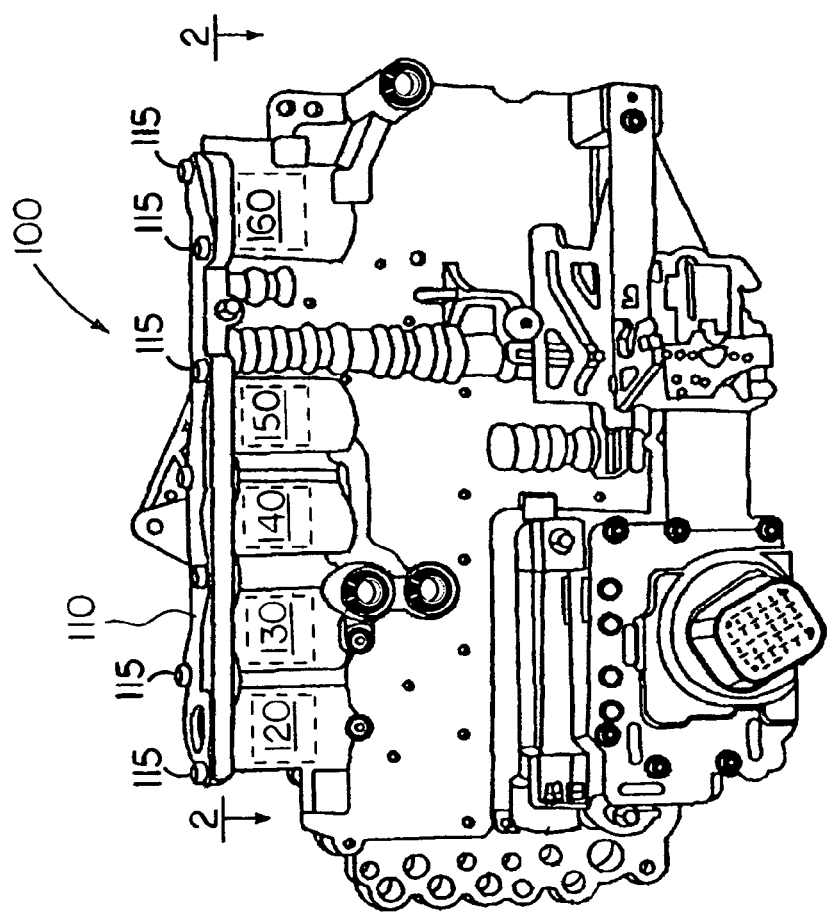
FIG. 1 is a perspective view of the valve body of the CHRYSLER transmissions showing the OEM accumulator plate installed in its functional position and is labeled Prior Art.

With reference to the drawings there is shown therein a valve body, indicated generally at 100, for a CHRYSLER transmission in accordance with the prior art and illustrated in FIG. 1. A plurality of accumulator assemblies at 120, 130, 140, 150, 160 are installed within valve body 100 in the locations shown.

Figure 2:
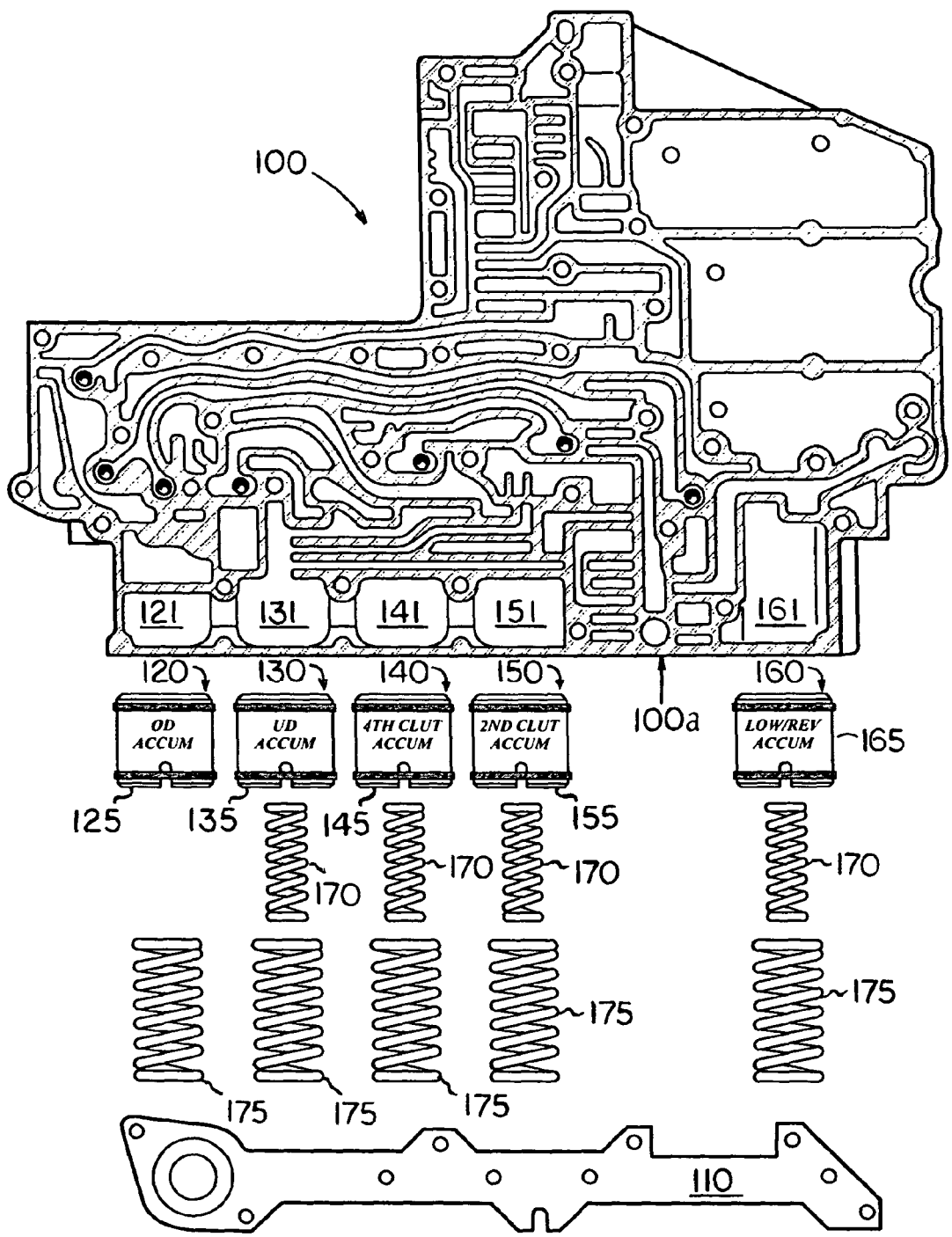
FIG. 2 is an exploded longitudinal cross-section taken along section line 2-2 of FIG. 1 rotated 90° showing the accumulator assemblies removed from the valve body and is labeled Prior Art.

As more clearly shown in FIG. 2 each accumulator assembly 120, 130, 140, 150, 160 comprises an accumulator piston 125, 135, 145, 155, 165 respectively which is installed in a mating cylindrical bore 121, 131, 141, 151, 161 formed in the valve body 100. Each accumulator assembly 120, 130, 140, 150, 160 also includes at least one compression spring 170, 175 which engages each piston 125, 135, 145, 155, 165 in coaxial relation thereto within piston bores 121, 131, 141, 151, 161. Each accumulator assembly 120, 130, 140, 150, 160 is retained in its mating bore 121, 131, 141, 151, 161 under spring pressure by an OEM accumulator plate 110 attached to valve body 100.

Figure 3:
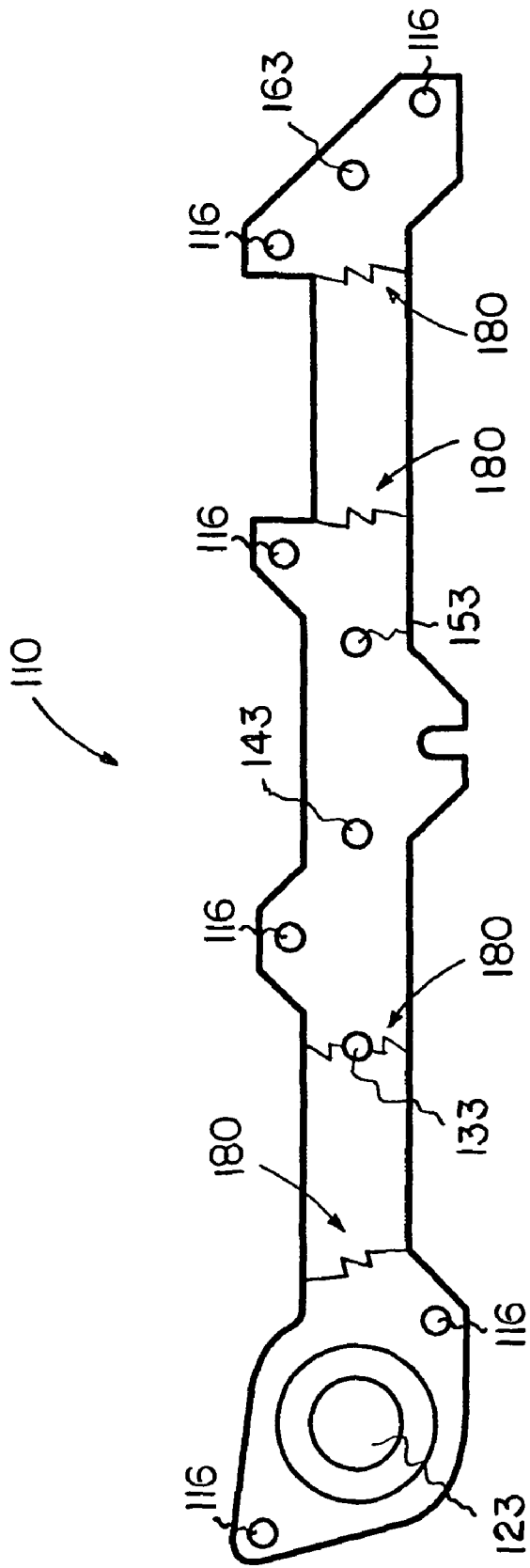
FIG. 3 is a plan view of the OEM accumulator plate indicating the locations known for crack formation and is labeled Prior Art.

As shown in FIG. 3 the OEM accumulator plate 110 includes an array of access openings 123, 133, 143, 153, 163, which provide for inspection of the accumulator assemblies 120, 130, 140, 150, 160 during maintenance operations. OEM plate 110 is attached to valve body 100 using machine screws 115 (FIG. 1) which extend through a pattern of mounting holes 116 formed in the plate as shown in FIG. 3. A locating slot 118 serves to position the plate 110 on a machine screw 115 (FIG. 1) for ease of installation.

Figure 4:
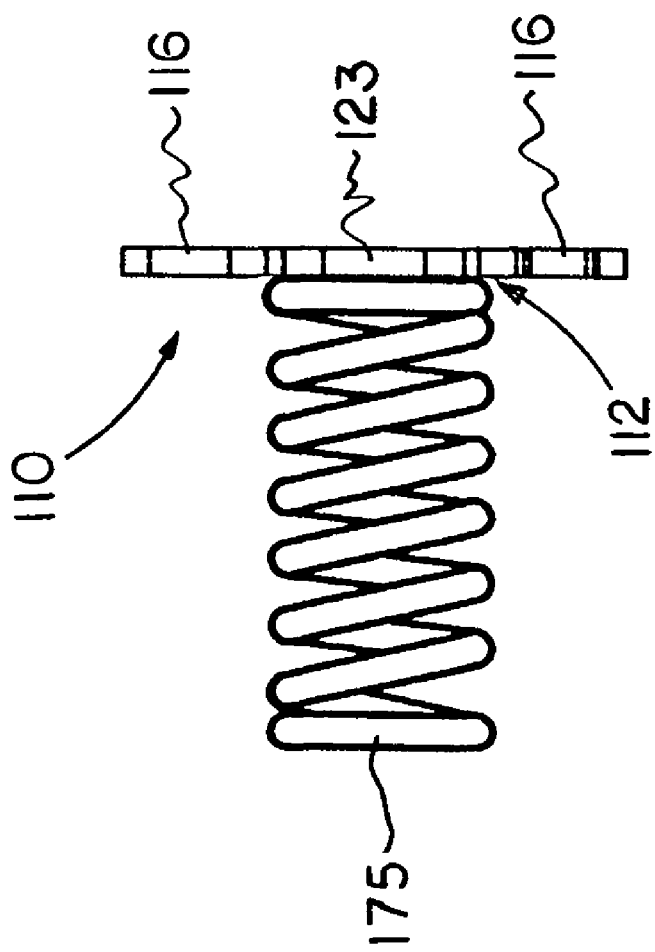
FIG. 4 is a side elevation view showing a coil spring seated against the OEM accumulator plate and is labeled Prior Art.

In operation accumulator assemblies 120, 130, 140, 150, 160 function to control shift feel whenever a particular gear range is selected and its clutch is applied. When such shift events occur, clutch apply fluid pressure actuates the corresponding accumulator piston 125, 135, 145, 155, 165 and moves it against the force of springs 170, 175. Thus, accumulator assemblies 120, 130, 140, 150, 160 absorb some of the initial increase of clutch fluid pressure (i.e. fluid shock) and cushion the clutch apply force. Still referring to FIG. 3 an inherent problem in the design of the OEM accumulator plate 110 is that the continuous reciprocation of the accumulator pistons 125, 135, 145, 155, 165 against the pressure of springs 170, 175 in operation causes flexion and introduces mechanical stress in the plate 110 at the spring/plate interface, indicated generally at 112 (FIG. 4). Such stress concentration eventually causes cracks, indicated generally at 180, in the OEM accumulator plate 110 as shown in FIG. 3 resulting in poor shift quality and damaged clutches and bands in the transmission. As this stress concentration at the spring/plate interface 112 becomes more severe, the pistons 125, 135, 145, 155, 165 can be deflected out of perpendicular within bores 121, 131, 141, 151, 161 scoring the piston bores and eventually causing seizure and malfunction of the accumulator pistons.

Figure 5:
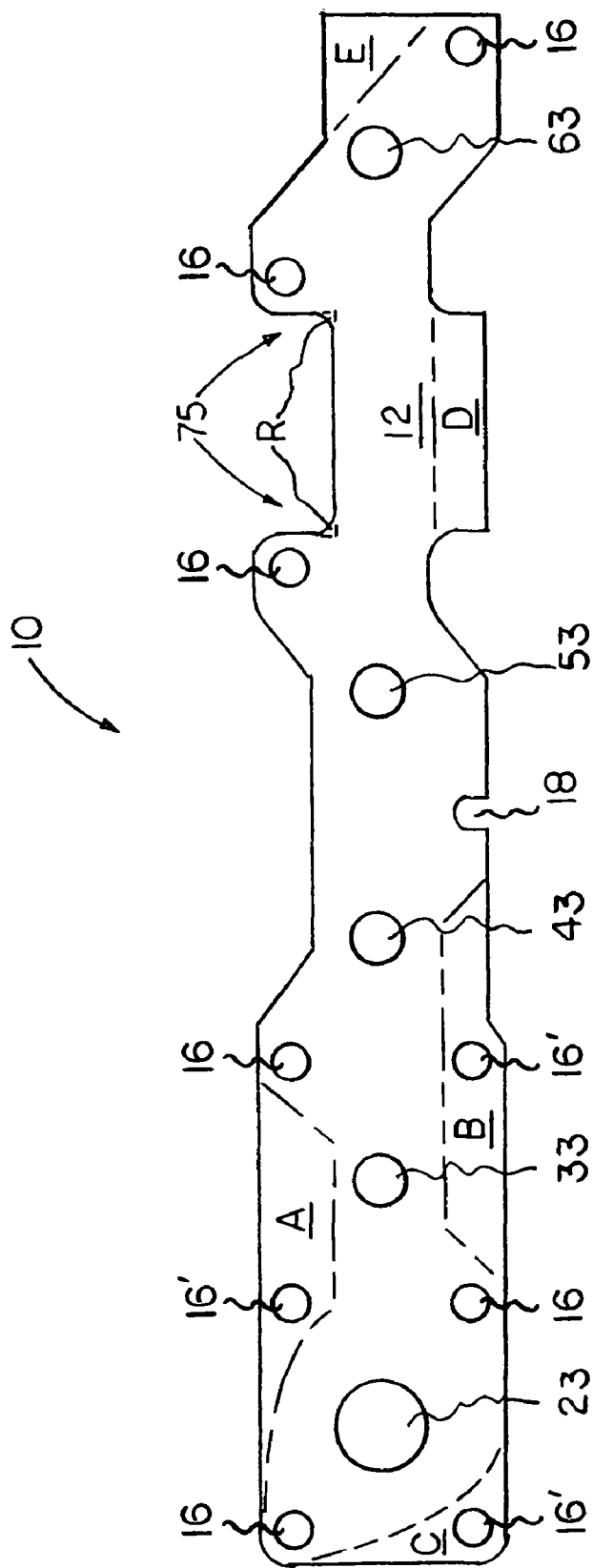
FIG. 5 is a composite plan view of the replacement accumulator plate of the present invention showing the profile of the OEM accumulator plate in phantom outline for comparison purposes.

Thus, the present invention has been developed to resolve this problem and will now be described. Referring to FIG. 5 there is shown a replacement accumulator plate in accordance with the present invention, indicated generally at 10. It can be seen that the present accumulator plate 10 is also comprised of an elongated body member 12 fabricated from steel or other suitable material that is configured to fit the lateral edge 100a (FIG. 2) of the OEM valve body 100 and to conform to the features thereof. Body member 12 also includes an array of access openings 23, 33, 43, 53, 63, which provide for inspection of the accumulator assemblies 120, 130, 140, 150, 160 and springs 70, 75 during maintenance operations.

The present plate 10 is provided with structures comprising stress reducing means including, but not limited to, the following structures. Plate 10 is also attached to valve body 100 using machine screws 115 (FIG. 1) which extend through a pattern of mounting holes 16, 16' formed in the plate. It will be noted that additional mounting holes 16' are provided in the present plate 10, which are not found in the OEM plate 110. Accordingly, it will be noted that the structure of body member 12 has been modified in proximity to such mounting holes 16' by the addition of integral stress reducing zones A, B, C, D, E, R (shown by phantom lines in FIG. 5) to provide added strength and rigidity to plate 10. Thus, the replacement accumulator plate 10 resists flexion, mechanical stress, and eventual breakage under the pressure of accumulator springs 170, 175, which is a chronic service problem in the OEM plate.

Zone "R" (FIG. 5) defines an enhanced structural feature in proximity to a pair of corner radii added to the plate 10 in a cutout portion thereof as at 75 to eliminate areas of stress concentration (i.e. sharp inside corners) found in the OEM plate 110. The corner radii formed in zone "R" substantially reduce flexion and crack formation in this area of the present plate 10. Zones D, E have been added to increase surface-to-surface contact with the lateral edge 100a of valve body 100 and to impart added stability to the plate 10 in the areas adjacent to low/reverse accumulator 160 (FIG. 2).

In a method of the present invention additional threaded holes (not shown) are drilled and tapped into the lateral edge 110a of the valve body 100 in alignment with the added mounting holes 16'. Such threaded holes (not shown) receive additional mating machine screws 115 which extend through mounting holes 16' formed in zones A, B, C to secure plate 10 in position providing increased strength and support to counteract the pressure generated by accumulator assemblies 120, 130, 140 in operation.

Although not specifically illustrated in the drawings, it should be understood that additional equipment and structural components will be provided as necessary and that all of the components described above are arranged and supported in an appropriate fashion to form a complete and operative Replacement Accumulator Plate and Method of Use incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

Having described preferred embodiments of our invention, what we desire to secure by U.S. Letters Patent is:

1. A replacement accumulator plate for providing functional support to a plurality of accumulator assemblies, including at least an overdrive accumulator assembly, disposed within a valve body of an automatic transmission, wherein said replacement accumulator plate replaces an original equipment manufacture accumulator plate having an elongated body member with a predetermined peripheral profile, wherein said body member further includes a first plurality of mounting holes for receiving fasteners for use in attachment of the original equipment manufacture accumulator plate to the valve body, wherein said replacement accumulator plate comprises:

a modified body member including a first portion and a second portion, said first portion having a generally rectangular configuration, a first plurality of mounting holes similarly positioned to the first plurality of mounting holes in the body member of the original equipment manufacture accumulator plate and a second plurality of mounting holes sized and positioned so as to receive fasteners for use in attachment of said replacement accumulator plate to the valve body proximate the overdrive accumulator assembly, said first portion being positionable proximate the overdrive accumulator assembly; and stress reducing portions integrated within said modified body member in said first portion and said second portion so as to impart added strength and stability to said modified body member.

2. The replacement accumulator plate of claim 1 wherein said stress reducing portions further include a plurality of corner radii formed on said modified body member in replacement of a plurality sharp inside corners formed in the original equipment manufacture accumulator plate.

3. The replacement accumulator plate of claim 1 further including an increased dimensional thickness of said modified body member in comparison to said original equipment manufacture accumulator plate so as to reduce flexion and to impart increased structural strength thereto.

4. An improved accumulator plate for providing functional support to a plurality of accumulator assemblies, including at least an overdrive accumulator assembly, disposed within a valve body of a Chrysler 45RFE transmission, wherein said improved accumulator plate replaces an original equipment manufacture accumulator plate having an elongated body member with a predetermined peripheral profile and a first plurality of mounting holes for receiving fasteners for use in attachment of said original equipment manufacture accumulator plate to the valve body, wherein the improvement comprises:

a modified body member having an expanded peripheral profile in comparison to the elongated body member of the original equipment manufacture accumulator plate; and a second plurality of mounting holes proximately positioned around the overdrive accumulator assembly and differing in location from the first plurality of holes of the original equipment manufacture accumulator plate.

5. The improved accumulator plate of claim 4 wherein said modified body member further include a plurality of corner radii in lieu of sharp inside corners formed in said original equipment accumulator plate.

6. The improved accumulator plate of claim 4 wherein said modified body member includes an increased dimensional thickness in comparison to said original equipment manufacture accumulator plate to reduce flexion and to provide increased structural strength.

7. A method of providing functional stability to a plurality of accumulator assemblies retained within a valve body of an automatic transmission by an original equipment manufacture accumulator plate, wherein the original equipment manufacture accumulator plate includes an elongated body member with a predetermined peripheral profile and further includes a first plurality of mounting holes for receiving fasteners for use in attachment of the original equipment manufacture accumulator plate to the valve body by fasteners, said method comprising the steps of:

providing a replacement accumulator plate having a first portion and a second portion, the first portion having a generally rectangular configuration, a first plurality of mounting holes similarly positioned to the first plurality of mounting holes in the body member of the original equipment manufacture accumulator plate, and a second plurality of mounting holes; drilling a plurality of holes in the valve body corresponding to the location of the second plurality of mounting holes; and installing the replacement accumulator onto the valve body using a first set of fasteners in the first plurality of mounting holes and using a second set of fasteners in the second plurality of mounting holes created by said drilling.

8. The method of claim 7 wherein the replacement accumulator plate has an increased dimensional thickness when compared to said original equipment manufacture accumulator plate.

\* \* \* \* \*